United States Patent [19]

Reiche et al.

[11] Patent Number: 4,962,944
[45] Date of Patent: Oct. 16, 1990

[54] MANUALLY HEIGHT-ADJUSTABLE STEERING COLUMN OF POWER VEHICLE

[75] Inventors: Carl-Heinz Reiche; Hans Arnold, both of Lage, Fed. Rep. of Germany

[73] Assignee: Reiche & Co., Lippe, Fed. Rep. of Germany

[21] Appl. No.: 353,075

[22] Filed: May 15, 1989

[30] Foreign Application Priority Data

May 19, 1988 [DE] Fed. Rep. of Germany ....... 8806563

[51] Int. Cl.$^5$ .............................................. B62D 1/18
[52] U.S. Cl. ....................................... 280/775; 74/493
[58] Field of Search ...................... 280/775, 771, 80.1; 74/493, 502

[56] References Cited

U.S. PATENT DOCUMENTS 4,602,520 7/1986 Nishikawa et al. ................. 280/775
4,796,481 1/1989 Nolte .................................... 280/775
4,819,961 4/1989 Henigue ............................... 280/775

Primary Examiner—Richard A. Bertsch
Attorney, Agent, or Firm—Michael J. Striker

[57] ABSTRACT

A manually height-adjustable steering column of power vehicle comprises an inner tube and an outer tube together forming a telescopeable tubular element, the inner and outer tubes having an overlapping and displacement region, the outer tube having a multi-cornered cross-section, two sliding bushes arranged in the region at a distance from one another and having sliding surfaces associated with the outer tube in the region, a rotary bar extending inside the inner tube and having two end pieces one of which is connected with the inner tube, one of the sliding bushes being arranged in the vicinity of an end of the inner tube and being mounted on the other of the end pieces, the other of the sliding bushes being mounted on an outer surface of the inner tube, the sliding surfaces of the one bush being offset relative to the sliding surfaces of the other sliding bush and orientable relative to sliding surfaces of the outer tube by a rotary deformation of the rotary bar.

8 Claims, 1 Drawing Sheet

MANUALLY HEIGHT-ADJUSTABLE STEERING COLUMN OF POWER VEHICLE

BACKGROUND OF THE INVENTION

The present invention relates to a steering column of a power vehicle, which can be height-adjusted by a manual force. More particularly, it relates to such a steeering column which has a telescopeable element with inner and outer tubes, and sliding bushes provided in an overlapping region of the inner tube with the outer tube and arranged at a distance from one another. In this steering column the flat sliding surfaces of the sliding bushes are associated with the sliding surfaces of the multi-cornered outer tube in the displacement region.

Manually height adjustable steering columns for power vehicles of the above mentioned general type are known in the art. One of such steering columns is disclosed, for example DE-OS 3,202,669. In this steering column the multicornered inner tube is provided with two injection molded or cast sliding bushes arranged at a distance from one another. The sliding surfaces of the sliding bushes coincide with one another and due to the manufacture in a joint casting or injection molding tool have low manufacturing tolerances which are independent from the manufacturing inaccuracies or manufacturing tolerances of the inner tube.

A part of the inner tube which lies between the sliding bushes is twisted during assembly, of the inner and outer tubes. Thereby, after the mounting of the telescopeable tubular element a force connection is produced between the outer and inner tubes. This connection insures a play-free condition between the parts of the telescopeable tubular element in the rotary direction of the steering column.

The sliding bushes which are mounted on the outer surface of the inner tube and arranged at such a distance from one another that an inner tube part is available between the sliding bushes can twist during assembling of the telescopeable element. Because of this, with a predetermined total length of the steering column, a correspondingly smaller displacement region between the outer tube and the inner tube is obtained.

SUMMARY OF THE INVENTION

Accordingly, it is an object of the present invention to provide a manually height-adjustable steering column for a power vehicle of the above mentioned type, in which the adjustment region in the outer and inner tubes is increased.

In keeping with these objects and with others which will become apparent hereinafter, one feature of the present invention resides, briefly stated, in that a sliding bush is provided in the vicinity of an end of the inner tube and mounted on an end piece of the rotary bar which extends in the inner space of the inner tube, the end piece of the rotary bar located inside the inner tube is connected with the inner tube, and the sliding surfaces of the bush which is fixedly connected with the rotary bar are offset relative to the sliding surfaces of the sliding bush which is mounted on the outer surface of the inner tube and are orientable relative to the sliding surfaces of the outer tube by a rotary deformation of the rotary bar.

Due to the rotary bar which is arranged in the inner space of the inner tube and is twisted during the assembly of the telescopeable tubular element in its elasticity region, a small structural length and a respectively long adjustment region relative to the outer tube is produced for both sliding bushes. This long adjustment region of the steering column for the power vehicle has considerable advantages in the event of impact of the power vehicle. The reason is that the respective safety features can be provided in that the steering wheel can move back from the driver with full utilization of the long adjustment region.

In accordance with another feature of the present invention the sliding bush which is fixedly connected with the rotary bar has an end surface which abuts against the end surface of the inner tube.

Still another feature of the present invention is that the rotary bar has a round cross-section, while the end pieces of the rotary bar have a multi-cornered cross-section.

In accordance with a further feature of the present invention, the end piece of the rotary bar which lies inside the inner tube is welded with the inner tube.

Still a further feature of the present invention is that the end piece of the rotary bar which faces away of the sliding bush fixedly connected with the rotary bar form-lockingly engages in the inner tube.

Finally, the bar lies in the region of the sliding bush which is fixed on the outer surface of the inner tube.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
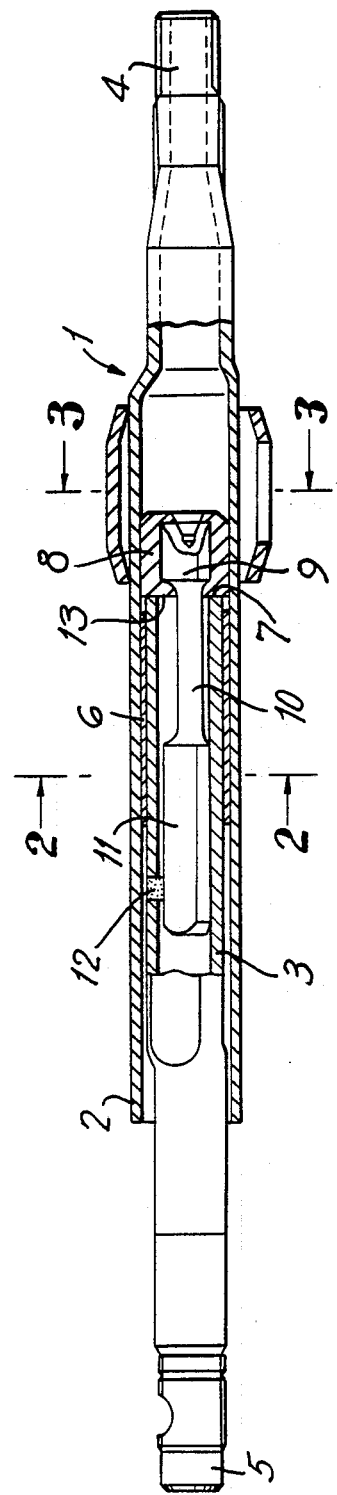
FIG. 1 is a view showing a partially sectioned manually height-adjustable steering column for a power vehicle in accordance with the present invention.

A steering column of a power vehicle is identified as a whole with reference numeral 1. It is formed as a telescopeable tubular element including an outer tube 2 and an inner tube 3. The outer tube 2 has an outer end for mounting a steering wheel. The inner tube 3 has an outer end 5 for a steering transmission.

Figure 3:
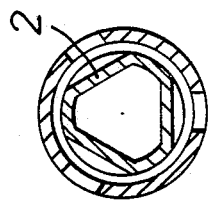
FIG. 3 is a view showing a section taken along the line III—III in FIG. 1.
Figure 2:
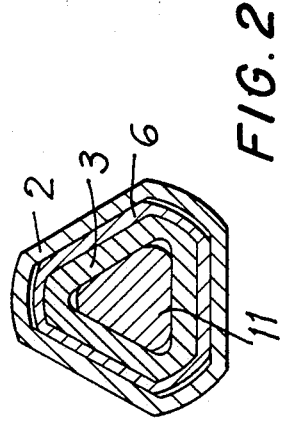
FIG. 2 is a view showing a section taken along the line II—II in FIG. 1, on an enlarged scale.

The telescopeable tubular element has an overlapping and displacing region between the outer tube 2 and the inner tube 3. As can be seen from FIGS. 2 and 3, the outer tube 2 in this region is formed multi-cornered. In the shown embodiment it has a triangular cross-section. The inner tube 3 has an outer contour which corresponds to the inner contour of the cross-section of the outer tube 2.

A sliding bush 6 is cast or injected on the outer surface of the inner tube 3. As can be seen from FIG. 1, the sliding bush 6 extends to the vicinity of an end 7 of the inner tube 3. A second sliding bush 8 is provided in the vicinity of the end 7 of the inner tube 3, and in particular outside the inner tube. The sliding bush 8 is mounted on an end piece 9 of a rotary bar 10. The rotary bar 10 has another end piece 11 which is formed in correspondence with the inner contour of the inner tube 3. The end piece 11 form-lockingly engages in the inner tube 3 as can be seen from FIG. 2. An additional fixation of the end piece 11 against an axial displacement inside the inner tube is performed by a welding point 12 which connects the end piece 11 with the inner tube 3.

The sliding bush 6 has sliding surfaces which are formed with a small rotary angular offset relative to the associated sliding surfaces of the sliding bush 8. During insertion of the inner tube into the outer tube, an orientation of the sliding surfaces of the above mentioned sliding bushes relative to the sliding surfaces of the outer tube is obtained. Then the rotary bar 10, which for example has a round cross-section, is twisted in its elastic region. Thereby a play-free connection between the outer tube and the inner tube in the rotary direction is achieved.

The end piece 9 which is cast or injection molded on the sliding bush 8 has a multi-cornered cross-section. The sliding bush 8 has an end surface 13 which abuts against the end surface 7 of the inner tube 3.

It will be understood that each of the elements described above, or two or more together, may also find a useful application in other types of constructions differing from the types described above.

While the invention has been illustrated and described as embodied in a manually height-adjustable steering column of a power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A manually height-adjustable steering column of power vehicle, comprising an inner tube and an outer tube together forming a telescopeable tubular element, said inner and outer tubes having an overlapping and displacement region, said outer tube having a multi-cornered cross-section; two sliding bushes arranged in said region at a distance from one another and having sliding surfaces associated with said outer tube in said region; a rotary bar extending inside said inner tube and having two end pieces one of which is connected with said inner tube, one of said sliding bushes being arranged in the vicinity of an end of said inner tube and being mounted on the other of said end pieces, the other of said sliding bushes being mounted on an outer surface of said inner tube, said sliding surfaces of said one bush being offset relative to said sliding surfaces of said other sliding bush and orientable relative to sliding surfaces of said outer tube by a rotary deformation of said rotary bar.

2. A steering column as defined in claim 1, wherein said sliding bushes are formed as injection-molding-produced sliding bushes.

3. A steering column as defined in claim 1, wherein said sliding bushes are formed as cast-produced sliding bushes.

4. A steering column as defined in claim 1, wherein said one end piece which is located inside said inner tube is fixedly connected with said inner tube by welding.

5. A steering column as defined in claim 1, wherein said rotary bar lies in the region of said other sliding bush which is mounted on the outer surface of said inner tube.

6. A manually height-adjustable steering column of power vehicle, comprising an inner tube and an outer tube together forming a telescopeable tubular element, said inner and outer tubes having an overlapping and displacement region, said outer tube having a multi-cornered cross-section; two sliding bushes arranged in said region at a distance from one another and having sliding surfaces associated with said outer tube in said region; a rotary bar extending inside said inner tube and having two end pieces one of which is connected with said inner tube, one of said sliding bushes being arranged in the vicinity of an end of said inner tube and being mounted on the other of said end pieces, the other of said sliding bushes being mounted on an outer surface of said inner tube, said sliding surfaces of said one bush being offset relative to said sliding surfaces of said other sliding bush and orientable relative to sliding surfaces of said outer tube by a rotary deformation of said rotary bar, said inner tube having an end surface, said one sliding bush being fixedly connected with said rotary bar and having an end surface abutting against said end surface of said inner tube.

7. A manually height-adjustable steering column of power vehicle, comprising an inner tube and an outer tube together forming a telescopeable tubular element, said inner and outer tubes having an overlapping and displacement region, said outer tube having a multi-cornered cross-section; two sliding bushes arranged in said region at a distance from one another and having sliding surfaces associated with said outer tube in said region; a rotary bar extending inside said inner tube and having two end pieces one of which is connected with said inner tube, one of said sliding bushes being arranged in the vicinity of an end of said inner tube and being mounted on the other of said end pieces, the other of said sliding bushes being mounted on an outer surface of said inner tube, said sliding surfaces of said one bush being offset relative to said sliding surfaces of said other sliding bush and orientable relative to sliding surfaces of said outer tube by a rotary deformation of said rotary bar, said rotary bar having a round cross-section, said end pieces of said rotary bar having a multi-cornered cross-section.

8. A manually height-adjustable steering column of power vehicle, comprising an inner tube and an outer tube together forming a telescopeable tubular element, said inner and outer tubes having an overlapping and displacement region, said outer tube having a multi-cornered cross-section; two sliding bushes arranged in said region at a distance from one another and having sliding surfaces associated with said outer tube in said region; a rotary bar extending inside said inner tube and having two end pieces one of which is connected with said inner tube, one of said sliding bushes being arranged in the vicinity of an end of said inner tube and being mounted on the other of said end pieces, the other of said sliding bushes being mounted on an outer surface of said inner tube, said sliding surfaces of said other sliding bush and orientable relative to sliding surfaces of said outer tube by a rotary deformation of said rotary bar, said one sliding bush being fixedly connected with said rotary bar, said other end piece of said rotary bar which faces away of said one sliding bush being form-lockingly engaged in said inner tube.

* * * * *